(12) United States Patent
Vartanov et al.

(10) Patent No.: US 10,628,466 B2
(45) Date of Patent: Apr. 21, 2020

(54) SMART EXCHANGE DATABASE INDEX

(71) Applicant: Quest Software Inc., Aliso Viejo, CA (US)

(72) Inventors: Sergey Romanovich Vartanov, St. Petersburg (RU); Alexander Gennadievich Stepanoff, Kolpino (RU); Sergey Evgenievich Zalyadeev, St. Petersburg (RU)

(73) Assignee: Quest Software Inc., Aliso Viejo, CA (US)

( * ) Notice: Subject to any disclaimer, the term of this patent is extended or adjusted under 35 U.S.C. 154(b) by 292 days.

(21) Appl. No.: 14/989,657

(22) Filed: Jan. 6, 2016

(65) Prior Publication Data
US 2017/0193079 A1   Jul. 6, 2017

(51) Int. Cl.
*G06F 16/20* (2019.01)
*G06F 16/31* (2019.01)
*H04L 12/58* (2006.01)

(52) U.S. Cl.
CPC .......... *G06F 16/316* (2019.01); *H04L 51/06* (2013.01); *H04L 51/08* (2013.01); *H04L 51/22* (2013.01); *H04L 51/34* (2013.01)

(58) Field of Classification Search
CPC .. G06F 17/30619; G06F 17/211; H04L 51/08; H04L 51/22; H04L 51/34
USPC ...................................................... 707/741
See application file for complete search history.

(56) References Cited

U.S. PATENT DOCUMENTS

| | | | | |
|---|---|---|---|---|
| 6,088,796 | A * | 7/2000 | Cianfrocca | H04L 63/0209 713/152 |
| 6,154,738 | A * | 11/2000 | Call | G06Q 20/201 705/20 |
| 8,447,826 | B1 * | 5/2013 | Mannnohan | G06F 11/2033 709/206 |
| 9,197,419 | B1 * | 11/2015 | Chandrasekhar | H04L 9/085 |
| 9,225,720 | B1 * | 12/2015 | Chandrasekhar | H04L 63/10 |
| 9,697,263 | B1 * | 7/2017 | Girulat, Jr. | G06Q 10/00 |
| 9,767,480 | B1 * | 9/2017 | Gottlieb | G06Q 30/0248 |
| 2002/0161745 | A1 * | 10/2002 | Call | A61L 2/10 |
| 2009/0234908 | A1 * | 9/2009 | Reyhner | G06F 9/546 709/203 |
| 2010/0185593 | A1 * | 7/2010 | Wong | G06F 16/2379 707/684 |
| 2011/0214064 | A1 * | 9/2011 | Schneider | G06F 16/2386 715/741 |
| 2012/0278341 | A1 * | 11/2012 | Ogilvy | G06F 17/30616 707/749 |

(Continued)

*Primary Examiner* — Belix M Ortiz Ditren
*Assistant Examiner* — Abdullah A Daud
(74) *Attorney, Agent, or Firm* — Kirton McConkie; Brian Tucker

(57) ABSTRACT

A full-text index can be created for each mailbox of an EDB to facilitate the performance of complex queries to quickly search for email data. In this way, relevant email data can be identified and retrieved quickly and efficiently from the full-text index rather than from the EDB. To create such indexes, each email in a mailbox can be retrieved and processed to convert the email from its native format into textual name/value pairs which can then be submitted for indexing. This use of name/value pairs to index each email enables the emails across all mailboxes to be efficiently queried using any possible combination of values.

20 Claims, 6 Drawing Sheets

(56) References Cited

U.S. PATENT DOCUMENTS

| | | | |
|---|---|---|---|
| 2013/0080785 A1* | 3/2013 | Ruhlen | H04L 67/16 |
| | | | 713/176 |
| 2014/0201187 A1* | 7/2014 | Larson | G06F 16/2228 |
| | | | 707/711 |
| 2015/0120676 A1* | 4/2015 | Iyengar | G06Q 50/20 |
| | | | 707/687 |
| 2016/0267132 A1* | 9/2016 | Castellanos | G06F 16/256 |
| 2016/0299697 A1* | 10/2016 | Chen | G06F 3/0611 |
| 2017/0017692 A1* | 1/2017 | Das | G06F 16/22 |
| 2017/0078232 A1* | 3/2017 | Faruk | H04L 67/02 |
| 2017/0192970 A1* | 7/2017 | Aasheinn | H04L 67/1097 |

* cited by examiner

600

601
For Each Of A Number Of Mailboxes Stored In An EDB, Access The EDB To Retrieve Each Email In The Mailbox, At Least Some Of The Emails Including Content That Is Not Formatted As Plain Text

602
For Each Accessed Email, Convert Content Of The Email That Is Not Formatted As Plain Text Into Plain Text

603
Create An Indexing Request That Identifies A Full-text Index Corresponding To The Mailbox And That Includes The Content Of The Email In Plain Text Format

604
Submit The Indexing Request To Cause The Content Of The Email To Be Stored In The Full-text Index

*FIG. 6*

SMART EXCHANGE DATABASE INDEX

CROSS-REFERENCE TO RELATED APPLICATIONS

N/A

BACKGROUND

The present invention is generally directed to providing a smart Exchange Database index that facilitates the searching and recovery of email data. In particular, the present invention can be employed to create a full-text index of an offline Exchange Database to provide the ability to perform complex queries to search for messages, folders, and attachments quickly.

IT administrators are oftentimes required to access archived email data. For example, a company involved in litigation or a regulatory proceeding may be required to disclose emails and/or attachments that are relevant to the litigation or proceeding. Similarly, a company may desire to access archived email data as part of an internal evaluation or investigation. In any case, it can be difficult to identify and retrieve relevant email data due to the manner in which current email solutions archive the data.

For example, Microsoft Exchange archives email data using an Exchange Database (EDB). The EDB generally comprises an .edb file and corresponding log files. The .edb file is the main repository for the email data and employs a B+ tree structure to store this data. Microsoft provides an Extensible Storage Engine (ESE) that is configured to maintain and update the EDB. Generally speaking, ESE is positioned between Exchange and the EDB and accepts requests from Exchange (via an API) to update the EDB (e.g., to update the EDB to include a new email).

Due to the format of an EDB (which is a type of indexed sequential access method (ISAM) file), it is not possible to access an EDB using complex SQL queries. Instead, the ESE provides an API through which clients (e.g., Exchange) can access the records of the EDB in a sequential manner. Although the details of employing the ESE API to access an EDB are beyond the scope of the present discussion, the following simplified overview will be provided to give context for why it is difficult to search an EDB for relevant email data.

An EDB is stored as a single file and consists of one or more tables. Data is organized in records (or rows) in the table with one or more columns. One or more indexes are also defined which identify different organizations (or orderings) of the records in the table. Using the ESE API, a client (e.g., Exchange), can create a cursor that navigates the records in the database in accordance with the ordering defined by a particular index. In other words, the ESE API allows the client to position the cursor at a particular record in a table and to commence reading records sequentially beginning at that particular record.

Because the ESE API is limited to this type of sequential access of records, it can be very time consuming to search an EDB for relevant email data. For example, if a company were required to search the mailboxes of all of its employees to identify any email with a particular phrase, it would require sequentially reading every record of every table in every EDB that stores email data for any of the employees and then evaluating each retrieved email to determine whether it contains the particular phrase. Accordingly, a more efficient way to search email data that is stored in an EDB is needed.

BRIEF SUMMARY

The present invention extends to methods, systems, and computer program products for providing a smart Exchange Database index to facilitate the searching of email data that is stored in an EDB. In exemplary embodiments, the present invention can be employed to create a full-text index from an EDB to facilitate the performance of complex queries to quickly search for email data. In this way, relevant email data can be identified and retrieved quickly and efficiently from the full-text index to eliminate the need to perform such searching via the ESE API.

In embodiments of the present invention, a full-text index can be created for each mailbox contained in an EDB. To create such indexes, each email in a mailbox can be retrieved and processed to convert the email from its native format into textual name/value pairs which can then be submitted for indexing. This use of name/value pairs to index each email enables the emails across all mailboxes to be efficiently queried using any possible combination of values.

In one embodiment, the present invention is implemented as a method for creating a full-text index from a mailbox stored in an EDB. For each of a number of mailboxes stored in an EDB, the EDB is accessed to retrieve each email in the mailbox. At least some of the emails include content that is not formatted as plain text. For each accessed email, content of the email that is not formatted as plain text is converted into plain text. An indexing request is generated that identifies a full-text index corresponding to the mailbox and that includes the content of the email in plain text format. The indexing request is then submitted to cause the content of the email to be stored in the full-text index.

In another embodiment, the present invention is implemented as a system for creating full-text indexes from mailboxes of an EDB. The system includes a database worker pool that is configured to launch a number of database mailbox enumerators. Each database mailbox enumerator is configured to employ a database controller to access a particular mailbox within the EDB to retrieve emails from the particular mailbox. Each database mailbox enumerator is further configured to convert each email into email data that is in plain text format. The system also includes an index writer pool that is configured to launch a number of index writers. Each index writer is configured to receive the email data from a corresponding database mailbox enumerator and to generate one or more indexing requests for storing the email data in a corresponding full-text index.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 6 illustrates a flowchart of an example method for creating a full-text index from a mailbox stored in an EDB.

DETAILED DESCRIPTION

In this specification and the claims, the term Exchange Database (or EDB) should be construed as a database that stores email data in accordance with an indexed sequential access method (ISAM). Therefore, although an EDB is a Microsoft-specific database, the term EDB as used herein should be construed to encompass other similarly structured and accessed ISAM-based databases that may not be Microsoft-specific. In other words, the present invention should not be limited to creating full-text indexes from Microsoft Exchange Databases.

Figure 1:
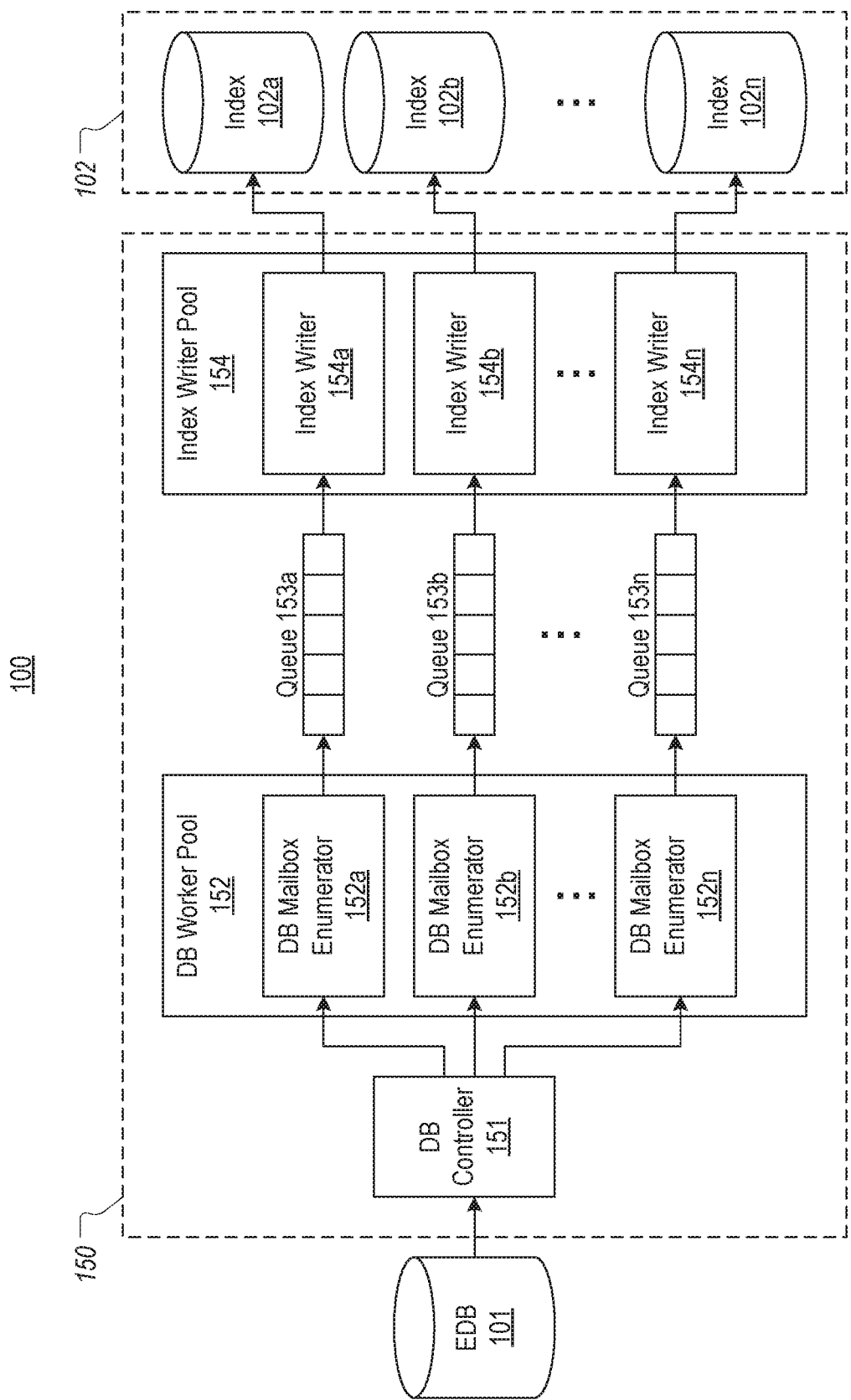
FIG. 1 illustrates an example computing environment in which the present invention can be implemented.

FIG. 1 illustrates an example computing environment 100 in which the present invention can be implemented. As shown, computing environment 100 includes an EDB 101. For purposes of this description, it will be assumed that EDB 101 serves as an archive for a company's email data and that the company desires to perform a search of the email data to retrieve email data relevant to a particular request (e.g., a litigation discovery request).

To alleviate many of the challenges of searching an EDB as addressed above, the present invention can provide a system 150 for converting individual mailboxes stored in EDB 101 into full-text indexes 102*a*-102*n* that can then be quickly and efficiently searched using many different types of SQL queries. In FIG. 1, system 150 is generally shown as including a DB controller 151, a DB worker pool 152 that includes a number of DB mailbox enumerators 152*a*-152*n*, a corresponding number of queues 153*a*-153*n*, and an index writer pool 154 that includes a corresponding number of index writers 154*a*-154*n*.

In a typical implementation, DB controller 151 can represent Microsoft's Extensible Storage Engine (ESE) which provides an API for accessing an EDB (e.g., ESENT.DLL). The ESE and its API are oftentimes referred to as Joint Engine Technology (JET) Blue and the JET API. In any case, DB controller 151 comprises the functionality by which a client can read records (i.e., email data) within an EDB.

DB worker pool 152 is configured to launch instances of DB mailbox enumerators. For example, FIG. 1 shows that a number of DB mailbox enumerators 152*a*-152*n* have been launched where each DB mailbox enumerator is configured to employ DB controller 151 to retrieve the contents of a particular mailbox stored in EDB 101. When DB controller 151 is the ESE, each of DB mailbox enumerators 152*a*-152*n* can be configured to submit appropriate API calls to the ESE to sequentially read the contents of the corresponding mailbox stored within EDB 101. It is noted that DB worker pool 152 launches a plurality of instances of DB mailbox enumerators so that a plurality of mailboxes can be accessed in parallel thereby increasing the speed and efficiency of retrieving email data from EDB 101.

Emails are typically stored in EDB 101 with the content of their bodies in either rich text (RTF) format or HTML format. Accordingly, as each DB mailbox enumerator retrieves an email from a mailbox in EDB 101, the body of the email will typically be either RTF or HTML. Also, email attachments will typically be formatted in a non-text format (e.g., PDF, PPT, XLS, DOCX, etc.). In accordance with embodiments of the present invention, each of DB mailbox enumerators 152*a*-152*n* can include/employ functionality for converting email data from its non-text format into a text format (i.e., plain text format) to allow the email data to be stored in a full-text index. For example, each DB mailbox enumerator can include/employ a RTF parser and an HTML parser for extracting the text from the body of the emails as well as an attachment parser for extracting the text from any attachments. The content of headers, fields, and other properties of an email are typically already in text format. However, in cases where such content may not be in text format, the DB mailbox enumerators can employ appropriate tools to convert the content into text format.

Accordingly, the output of DB mailbox enumerators 152*a*-152*n* can be email data that is in text format including the body and subject of the email, the contents of the to, from, cc, bcc, or other addressing fields and/or headers, any metadata of the email such as a folder it is stored in, an importance, created date, deleted date, received date, modified date, a classification, inclusion in a conversation, size, any hidden fields, etc., the title and content of any attachments, any metadata of an attachment such as size or mime, etc. In addition to these individual email-specific items, DB mailbox enumerators 152*a*-152*n* can also be configured to retrieve information about the mailbox and any folders it may include such as a mailbox name, mailbox size, mailbox message count, folder name, folder path, folder description, folder created date, folder class, folder item count, etc.

When DB mailbox enumerators 152*a*-152*n* have retrieved an email and converted it into text (including any attachments), this email data in text format can be passed into the corresponding queues 153*a*-153*n* which are positioned between DB worker pool 152 and index writer pool 154. Index writer pool 154 can be configured to launch a number of index writers 154*a*-154*n* which are each configured to access the textual email data from a corresponding queue 153*a*-153*n* and cause the text-based email data to be stored in a corresponding full-text index 102*a*-102*n*. In some embodiments, an index writer can employ information about the mailbox (e.g., the mailbox name) to ensure that the textual email data is stored properly as will be further described below.

In some embodiments, each of index writers 154*a*-154*n* can be configured to employ appropriate APIs of a full-text search and analytics engine 102 such as Elasticsearch. As an overview, Elasticsearch allows text-based data to be quickly indexed and then accessed using a REST API (e.g., JSON over HTTP). Accordingly, in typical embodiments, index writers 154*a*-154*n* can each be configured to create appropriately formatted HTTP requests for indexing each email (including any attachments) in the corresponding index. Once indexed, the email data can be accessed using text-based queries which will greatly increase the speed and efficiency of searching the email data.

In summary, system 150 can be configured to access individual mailboxes within EDB 101, convert the emails and any attachments into text format, and then submit the email data in text format for indexing in a full-text index. The use of DB worker pool 152 and index writer pool 154 allow this access, conversion, and indexing to be performed on multiple mailboxes in parallel. System 150 can also be scaled as necessary. For example, multiple CPUs can be employed to each execute an instance of DB worker pool 152 and index writer pool 154 to increase the parallel processing. Further, in some cases, DB worker pool(s) 152 can be executed on one or more separate machines from those used to execute index writer pool(s) 154 to thereby form an indexing cluster. Any of these customizations to the architecture of system 150 can be employed to increase the number of mailboxes that can be indexed in parallel.

Figure 2:
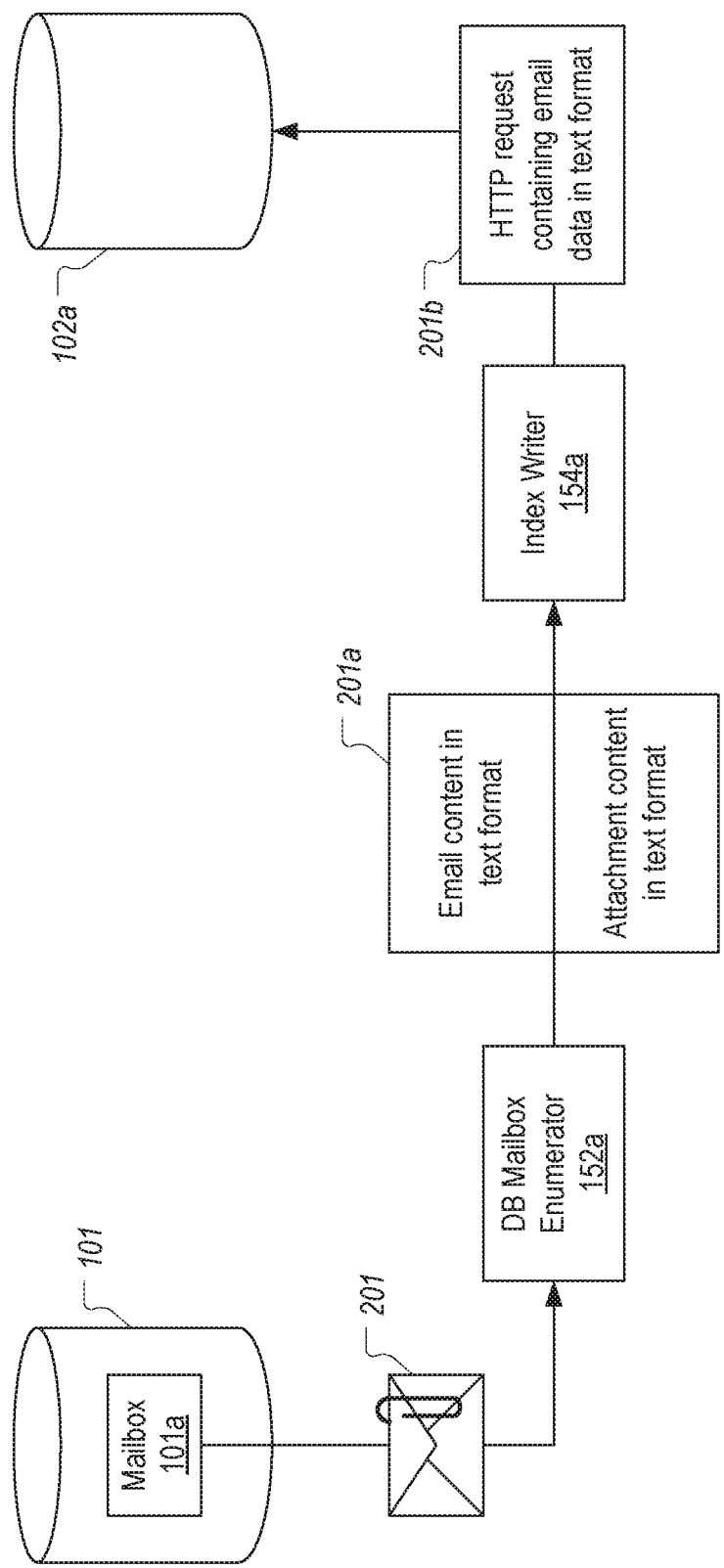
FIG. 2 illustrates how an email can be retrieved from a mailbox and converted from its native format into a text-based format suitable for inclusion in a request to index the email.

FIG. 2 illustrates a more detailed example of how system 150 may index email data from a particular mailbox 201 that is stored within EDB 101. For ease of illustration, only a portion of the components depicted in FIG. 1 are included in FIG. 2. As shown, EDB 101 is assumed to include a mailbox 101a and that mailbox 101a includes a number of emails such as email 201. Email 201 is also assumed to be in RTF format and to include an attachment that is in PDF format.

As described above, DB worker pool 152 can configure DB mailbox enumerator 152a to retrieve the emails from mailbox 101a (as well as the appropriate mailbox data) using the ESE API. Accordingly, FIG. 2 represents that DB mailbox enumerator 152a receives email 201 in RTF format with its accompanying attachment in PDF format. DB mailbox enumerator 152a can then convert the contents of the email and the attachment into email data 201a in text format (e.g., by using an RTF parser and a PDF parser). Email data 201a in text format can then be placed in queue 153a (not shown) to enable index writer 154a to access it.

Index writer 154a can then access email data 201a and create an appropriately formatted HTTP request 201b for indexing email data 201a. HTTP request 201b can identify an appropriate index in which email data 201a should be stored which in this case is assumed to be index 102a (i.e., index 102a corresponds to mailbox 101a). Index writer 154a can then transmit HTTP request 201b to full-text search and analytics engine 102 which will cause email data 201a to be stored in index 102a. Once stored in index 102a, email data 201a can then be searched/retrieved using text-based queries.

Figure 3:
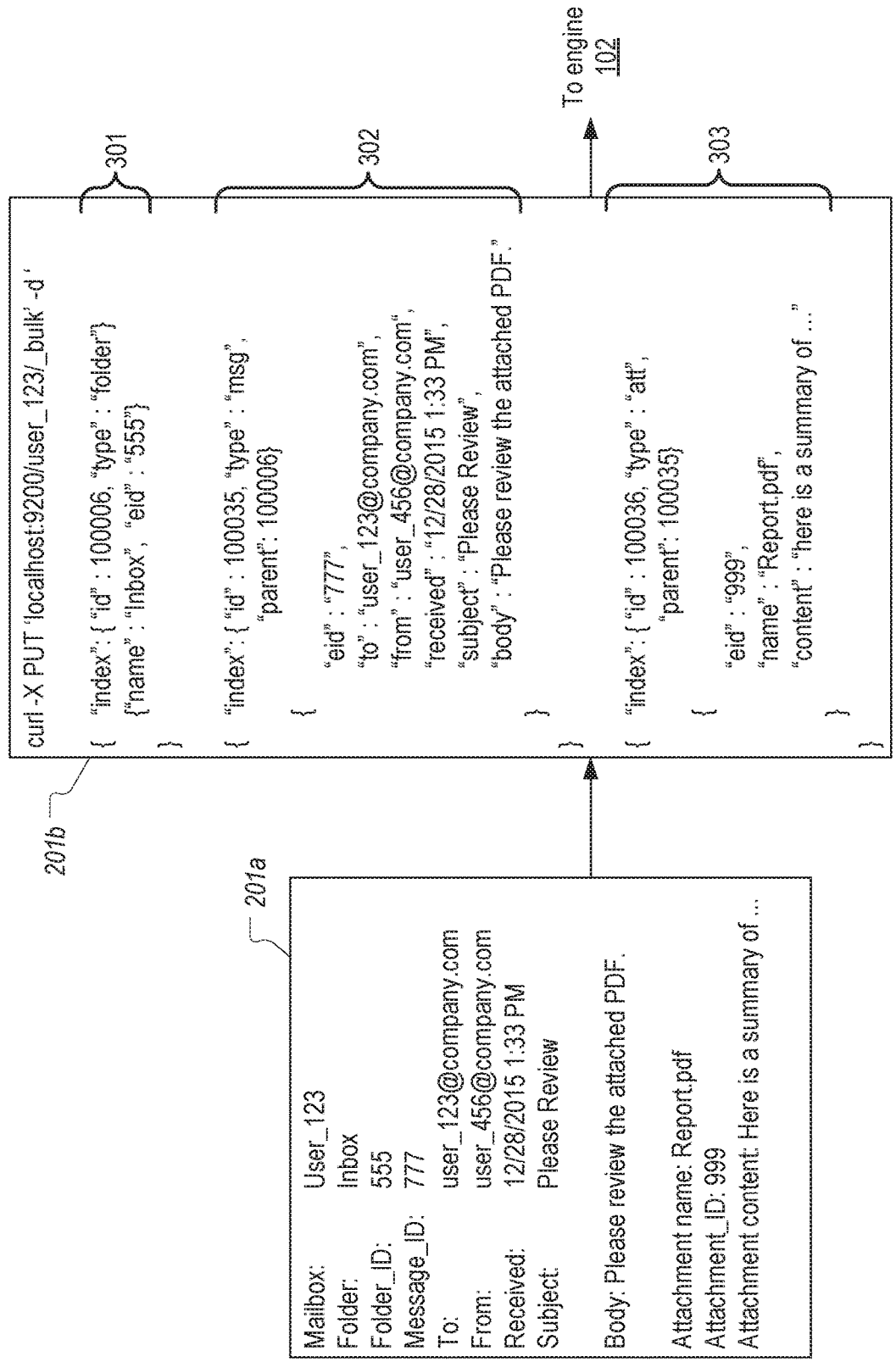
FIG. 3 illustrates a more detailed example of how the present invention can convert an email from its native format into an HTTP request that includes the content of the email structured as name/value pairs.

FIG. 3 illustrates a more detailed example of how index writer 154a can create HTTP request 201b from email data 201a. In this example, it will be assumed that email data 201a corresponds to an email retrieved from User_123's inbox folder and that a corresponding full-text index has already been created for User_123's mailbox. Email data 201a is shown as including content that is typical of an email including to, from, received, and subject fields (which are assumed to have already been in text format), a body (which is assumed to have been converted from RTF to text by DB mailbox enumerator 152a), an attachment name (which is assumed to have already been in text format), and attachment content (which is assumed to have been converted from PDF to text by DB mailbox enumerator 152a). Email data 201a is also shown as including mailbox and folder fields which identify that the email was stored in the inbox folder of User_123's mailbox. Email data 201a is further shown as including identifiers for the folder, message, and attachment (555, 777, and 999 respectively). These identifiers can represent the identifiers used to uniquely represent the records within the EDB (EDB identifiers or eids).

It is reiterated that the role of the DB mailbox enumerator is to retrieve emails from a particular mailbox in EDB 101 and to convert any of the email's non-text content into text content so that the email (or at least the relevant portions of the email) is fully represented as text. Accordingly, FIG. 3 represents that email data 201a, which is provided to index writer 154a, includes the email's content in text format along with the associated identifiers of the type of content.

Index writer 154a can process email data 201a to create an appropriately configured HTTP request 201b for storing email data 201a in the corresponding full-text index 102a. In FIG. 3, HTTP request 201b is structured in accordance with the Elasticsearch API as an example. In this example, the cUrl utility is employed to submit a Put request (—X PUT) to localhost on port 9200 where it is assumed the Elasticsearch engine is listening. Additionally, HTTP request 201b also includes the arguments "/user_123/_bulk." The argument after the first slash (i.e., "user_123") identifies the index into which the "documents" included in HTTP request 201b are to be stored. Also, the argument after the second slash (i.e., "_bulk") identifies that HTTP request 201b is a bulk request (i.e., that it includes more than one document to be inserted into the index).

In Elasticsearch, a document is the basic unit of information that can be indexed and a type must be specified for any document to be indexed. In accordance with some embodiments of the present invention, the full-text index for each mailbox can be structured hierarchically. In particular, the index can be structured with a folder type, a message type, and an attachment type. The message type can include a parent parameter that allows a folder to be identified as the parent of a particular message (i.e., defining which folder the message is stored in). Similarly, the attachment type can include a parent parameter that allows a message to be identified as the parent of a particular attachment (i.e., defining which email the attachment is attached to). This hierarchical structure may be preferred in many implementations because it can optimize storage of the email data. However, in other embodiments of the present invention, it is possible that only an email type is defined which includes properties defining the folder to which the email belongs and any attachments that it includes.

HTTP request 201b, as shown in FIG. 3, represents the case where index 102a is structured to include the hierarchical arrangement of folder, message, and attachment types. Accordingly, to store email data 201a in full-text index 102a, index writer 154a can structure HTTP request 201b as a bulk request that stores a folder document (assuming that the folder document was not previously created in index 102a), a message document, and an attachment document. Each of these documents can be defined as name/value pairs (e.g., in JSON format). For example, in FIG. 3, three portions 301, 302, and 303 of HTTP request 201b are identified.

Portion 301 defines a folder document (as represented by the type/folder pair) having a name of Inbox and an eid of 555 (where eid represents the identifier used in the EDB to uniquely identify the Inbox folder of User_123's mailbox). The id/100006 pair defines an identifier to be used within index 102a to represent this folder document. As indicated above, it is assumed that a folder document for the inbox has not previously been created in index 102a. However, if a folder document had already been created, portion 301 would not need to be included within HTTP request 201b.

Portion 302 defines a message document (as represented by the type/msg pair) that is stored in the inbox (as defined by the parent/100006 pair where 100006 is the id of the inbox folder document in index 102a). This message document is also given an id of 100035 to be used as the identifier within index 102a. The actual content of email 201 is then defined as name/value pairs. It is noted that a portion 302 only includes a subset of the possible name/value pairs. Importantly, these name/value pairs includes one for the body of the email that includes the content of the body in text format.

Portion 303 defines an attachment document (as represented by the type/att pair). This attachment document defines a parent id of 100035 (the id for the message document created for email 201) thereby associating the attachment with email 201. The attachment document also includes a number of name/value pairs, including, most notably, one for the content of the attachment that includes the content of the attachment in text format.

When HTTP request 201b is submitted, engine 102 will add these three documents (or name/value pairs) to index 102a. As a result, text-based queries can be employed to search index 102a to retrieve the content of email 201 including the content of email 201's attachment. It is again reiterated that the structure of HTTP request 201b including the name/value pairs of each document are only examples. A portion of a specific schema that can be employed for a full-text index is provided below as a non-limiting example to illustrate a number of possible name/value pairs that may be included in the different document types.

```
"folder" : {
    "_source" : {"enabled" : false },
    "_all" : {"enabled" : false},
    "properties" : {
        "eid" :    { "type" : "string", "store": true },
        "name" :   { "type" : "string"},
        "path" :   {
            "type":"string",
            "index":"analyzed",
            "store" : true,
            "fields" : {
                "path_analyzer":{
                    "type" : "string",
                    "index_analyzer" : "path-analyzer",
                    "search_analyzer": "keyword"
                },
                "not_analyzed":{
                    "type":"string",
                    "index":"not_analyzed"
                }
            }
        },
        "description" : { "type" : "string"},
        "created": { "type" : "date", "format": "date_time"},
        "folderclass" : { "type" : "string"},
        "item_count" : {"type" : "integer"},
        "mailbox_name" : { "type" : "string"},
        "mailbox_size" : { "type" : "long"},
        "mailbox_msg_count" : { "type" : "integer"}
    }
},
"msg" : {
    "_parent" : { "type" : "folder" },
    "_source" : {"enabled" : false },
    "_all" : {"enabled" : false},
    "properties" : {
        "eid" :    { "type" : "string", "store": true },
        "subject": { "type" : "string"},
        "from": { "type" : "string"},
        "to": { "type" : "string"},
        "cc": { "type" : "string"},
        "bcc": { "type" : "string"},
        "created": { "type" : "date", "format": "date_time" },
        "received": { "type" : "date", "format": "date_time"},
        "deleted": { "type" : "date", "format": "date_time"},
        "modified": { "type" : "date", "format": "date_time" },
        "body" : { "type" : "string" },
        "messageclass": { "type" : "string"},
        "categories" : { "type" : "string"},
        "importance" : { "type" : "string"},
```

-continued

```
        "conversation" : { "type" : "string"},
        "message_size" : { "type" : "long"},
        "hidden" : {"type":"boolean"}
    }
},
"att" : {
    "_parent" : {"type":"msg"},
    "_source" : {"enabled" : false },
    "_all" : {"enabled" : false},
    "properties" : {
        "eid" : { "type" : "string", "store": true },
        "name" : { "type" : "string"},
        "mime" : { "type" : "string" },
        "size" : {"type" : "long" },
        "file" : { "type" : "string"}
    }
}
```

DB mailbox enumerator 152a and index writer 154a can perform this process on all emails stored in mailbox 101a so that a complete full-text index 102a is created to represent mailbox 101a. With full-text index 102a created, User_123's mailbox can be quickly and efficiently searched by accessing full-text index 102a rather than by accessing mailbox 101a in EDB 101. This same process can also be performed to create a full-text index for every mailbox contained in EDB 101. In this way, text-based queries can be performed across all the full-text indexes to identify relevant email data without needing to access EDB 101.

Figure 4:
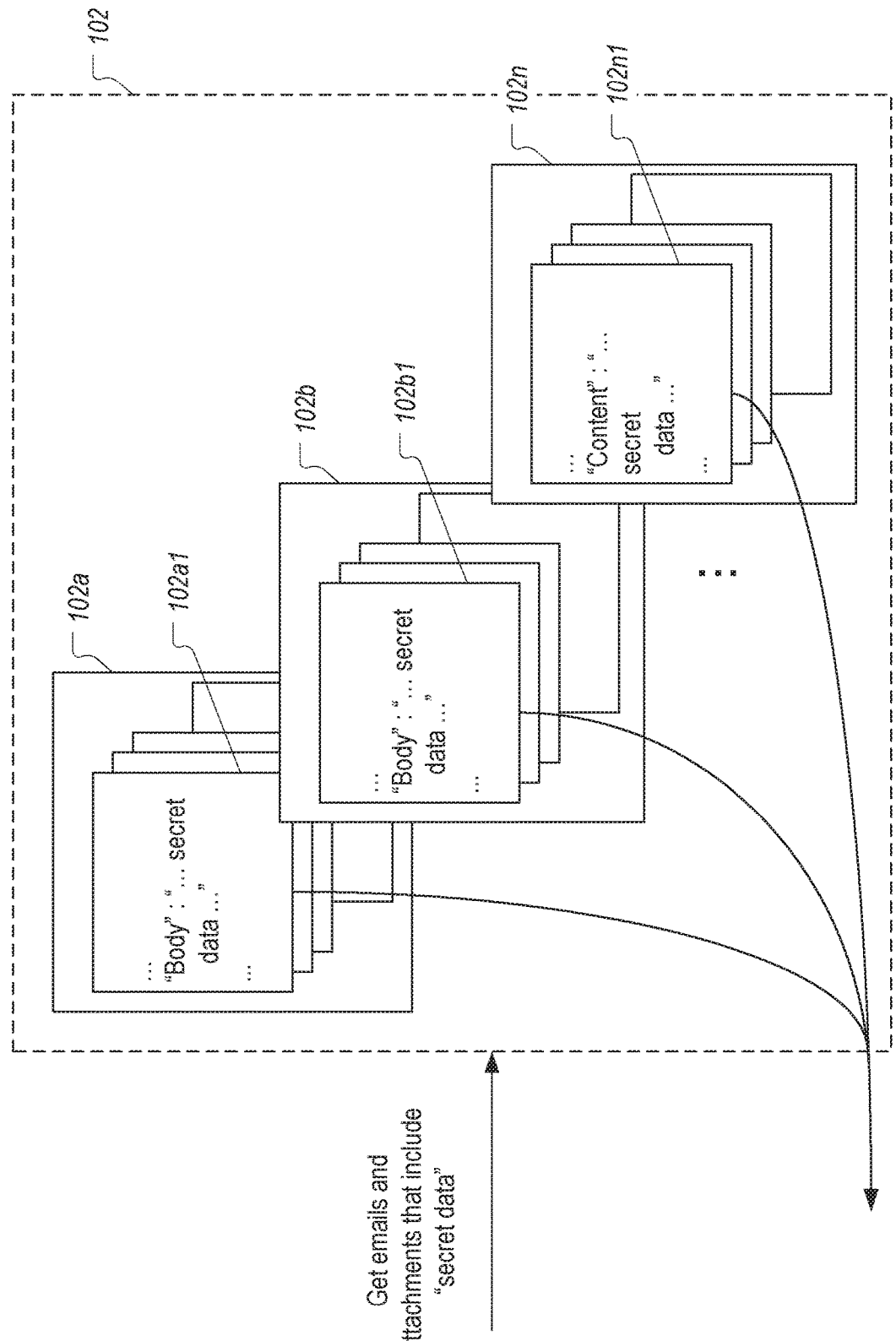
FIG. 4 illustrates an example of how the text-based indexes can be queried.

FIG. 4 provides one example of the type of queries that can be facilitated by creating full-text indexes of each mailbox in EDB 101. As shown, full-text indexes 102a-102n have been created for each mailbox stored in EDB 101 and each of these full-text indexes includes "documents" representing the folders, emails, and attachments of the corresponding mailbox. A user has submitted a query of "get emails and attachments that include 'secret data'" to engine 102. Because indexes 102a-102n are full-text indexes, this query can be quickly and efficiently processed by identifying which "msg" or "att" documents include a "body" or "content" name with a corresponding value that includes "secret data." In this case, it is assumed that documents 102a1 and 102b1, which represent emails, and document 102n1, which represents an attachment, match the query and would therefore be returned.

Other examples of the types of queries that can be facilitated by creating full-text indexes for each mailbox include: "get attachments of emails sent with high importance;" "get folders in a specific mailbox with a message count exceeding 1000; " and "get messages with a red category and an attachment that contains "credit." As can be seen, by converting emails from their native format into the textual name/value pairs (e.g., JSON name/value pairs), complex queries can be immediately performed based on any possible combination of values. In this way, the present invention can greatly expedite the process of accessing archived email data to search for relevant content.

Figure 5:
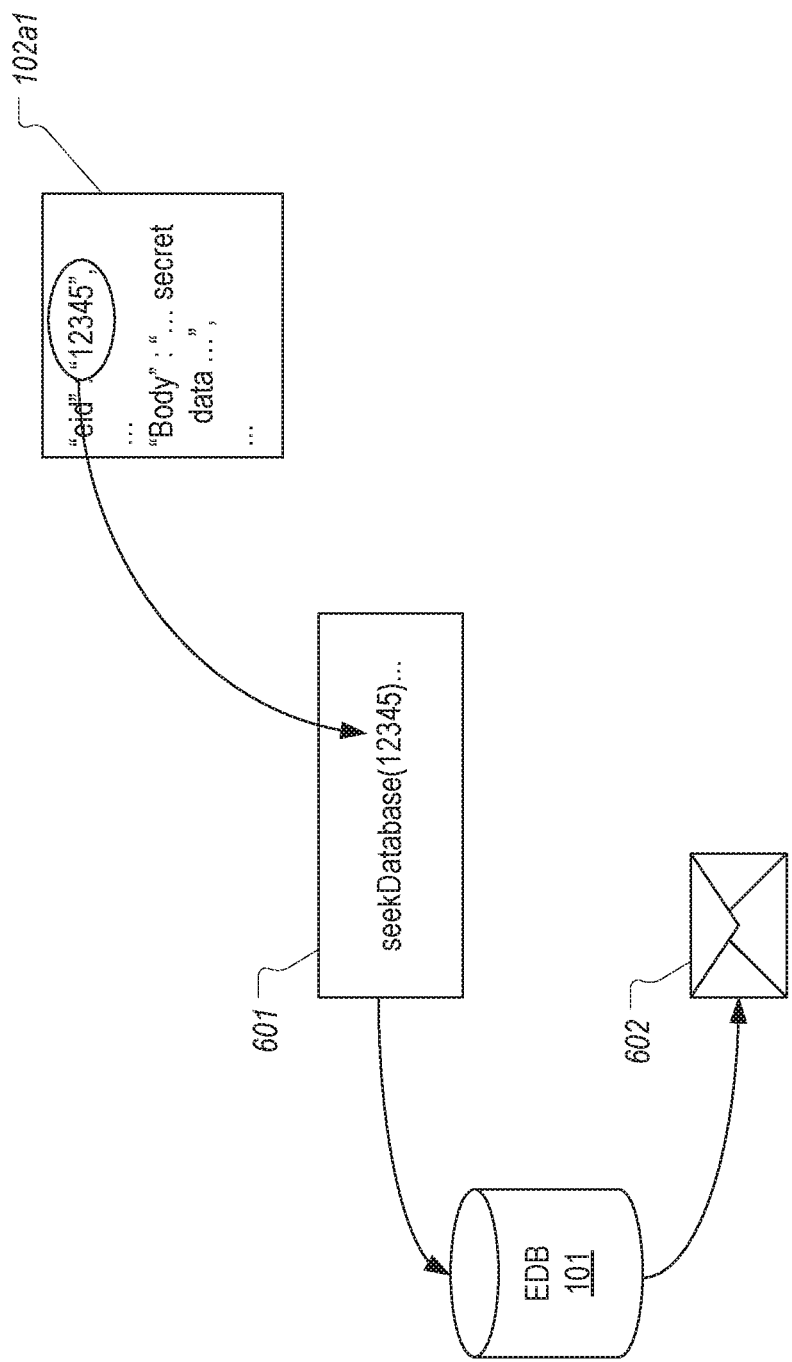
FIG. 5 illustrates an example of how an email can be retrieved from an EDB using an EDB identifier obtained from a corresponding document in the full-text index.

After a relevant document is identified by searching a full-text index, the corresponding email, attachment, and/or folder can then be retrieved if desired from the EDB. This retrieval is facilitated by storing the identifier of the email, attachment, or folder within the full-text index. FIG. 5 provides an example of how storing the EDB identifier (i.e., the eid referred to above, or, the OID as such identifiers are oftentimes referred to in Microsoft EDB documentation) can facilitate retrieving specific records from the EDB. In FIG. 5, document 102a1, which was returned by the example query of FIG. 4, is shown as including an eid of 12345. A retrieval tool could extract this eid from document 102a1 and employ it in an ESE API call 601 that would retrieve the specific record having the identifier 12345 (which in this example is assumed to be email 602).

FIG. 6 illustrates a flowchart of an example method 600 for creating a full-text index from a mailbox stored in an EDB. In exemplary embodiments, method 600 can be implemented in computing environment 100 as depicted in FIG. 1.

Method 600 includes an act 601 of, for each of a number of mailboxes stored in an EDB, accessing the EDB to retrieve each email in the mailbox, at least some of the emails including content that is not formatted as plain text. For example, DB mailbox enumerators 152a-152n can be employed to access EDB 101 via DB controller 151 to retrieve each email stored in a number of mailboxes. At least some of these emails may include a body that is formatted as RTF, HTML, or another non-plain-text format or an attachment in a non-plain-text format.

Method 600 includes an act 602 of, for each accessed email, converting content of the email that is not formatted as plain text into plain text. For example, DB mailbox enumerator 152a can employ a RTF parser, an HTML parser, or another tool for converting a portion of the content of email 201 or an attachment to plain text.

Method 600 includes an act 603 of creating an indexing request that identifies a full-text index corresponding to the mailbox and that includes the content of the email in plain text format. For example, index writer 154a can generate HTTP request 201b that identifies the full-text index 102a corresponding to User_123's mailbox and that includes the content of email 201 (and any attachments) in plain text format. In some embodiments, index writer 154a may also configure HTTP request 201b as a bulk request that includes content of other emails from User_123's mailbox that is also in plain text format.

Method 600 includes an act 604 of submitting the indexing request to cause the content of the email to be stored in the full-text index. For example, index writer 154a can submit HTTP request 201b to engine 102 to cause engine 102 to store the plain text content of email 201 in index 102a.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for creating a full-text index for each of a plurality of mailboxes stored in an Exchange database (EDB), the method comprising:
   identifying a plurality of mailboxes stored in an EDB;
   for each of the plurality of mailboxes stored in the EDB, launching a database (DB) mailbox enumerator and an index writer such that each DB mailbox enumerator and each index writer corresponds with a particular mailbox of the plurality of mailboxes stored in the EDB;
   wherein each DB mailbox enumerator;
      accesses the EDB to retrieve each email in the corresponding mailbox, at least some of the emails including content that is not formatted as plain text;
      for each email that was retrieved from the corresponding mailbox stored in the EDB, converts content of the email that is not formatted as plain text into plain text and provides the content of the email formatted in plain text to the corresponding index writer,
   wherein, for each email that was retrieved by the corresponding DB mailbox enumerator from the corresponding mailbox stored in the EDB, each index writer:
      receives the content of the email formatted in plain text;
      creates an indexing request that identifies a full-text index corresponding to the mailbox from which the email was accessed, the indexing request also including the content of the email, that was retrieved from the corresponding mailbox stored in the EDB, in plain text format; and
      submits the indexing request to cause the content of the email to be stored in the corresponding full-text index such that the content that is not formatted as plain text in the email retrieved from one of the plurality of mailboxes stored in the EDB is stored in plain text format in the full-text index that corresponds to the mailbox from which the email was accessed.

2. The method of claim 1, wherein the content that is not formatted as plain text comprises a body of the email.

3. The method of claim 1, wherein the content that is not formatted as plain text comprises an attachment of the email.

4. The method of claim 1, wherein the indexing request comprises an Hypertext Transfer Protocol (HTTP) request that includes a name of the mailbox to identify the corresponding full-text index.

5. The method of claim 1, wherein the content of the email is included in the indexing request as name/value pairs.

6. The method of claim 5, wherein the name/value pairs are structured in JavaScript Object Notation (JSON) format.

7. The method of claim 5, wherein the name/value pairs include a name/value pair for one or both of the following:
contents of a body of the email; or
contents of an attachment to the email.

8. The method of claim 5, wherein, for any email that includes an attachment, the indexing request is structured to cause the content of the attachment to be stored separately from but hierarchically associated with the content of the email.

9. The method of claim 1, wherein the plurality of DB mailbox enumerators access the plurality of mailboxes in parallel.

10. A method for creating a full-text index for each of a plurality of mailboxes stored in an Exchange database (EDB), the method comprising:
identifying a plurality of mailboxes stored in an EDB;
launching, by a database (DB) worker pool and for each of the plurality of mailboxes stored in the EDB, a DB mailbox enumerator such that each DB mailbox enumerator corresponds with a particular mailbox of the plurality of mailboxes stored in the EDB;
launching, by an index writer pool, an index writer for each of the DB mailbox enumerators such that each index writer corresponds with a particular DB mailbox enumerator;
wherein each DB mailbox enumerator:
accesses the EDB to retrieve each email in the corresponding mailbox, at least some of the emails including content that is not formatted as plain text;
for each email that was retrieved from the corresponding mailbox stored in the EDB, converts content of the email that is not formatted as plain text into plain text and provides the content of the email formatted in plain text to the corresponding index writer;
wherein, for each email that was retrieved by the corresponding DB mailbox enumerator from the corresponding mailbox stored in the EDB, each index writer:
receives the content of the email formatted in plain text;
creates an indexing request that identifies a full-text index corresponding to the mailbox from which the email was accessed, the indexing request also including the content of the email, that was retrieved from the corresponding mailbox stored in the EDB, in plain text format; and
submits the indexing request to cause the content of the email to be stored in the corresponding full-text index such that the content that is not formatted as plain text in the email retrieved from one of the plurality of mailboxes stored in the EDB is stored in plain text format in the full-text index that corresponds to the mailbox from which the email was accessed.

11. The method of claim 10, further comprising:
creating a queue for each DB mailbox enumerator, wherein each DB mailbox enumerator provides the content of the emails formatted in plain text to the corresponding index writer via the corresponding queue.

12. The method of claim 10, wherein each DB mailbox enumerator accesses the corresponding mailbox via a DB controller.

13. The method of claim 10, wherein each index writer submits each indexing request via an HTTP request.

14. The method of claim 10, wherein, for any email that includes an attachment, the indexing request is structured to cause the content of the attachment to be stored separately from but hierarchically associated with the content of the email.

15. The method of claim 10, wherein, for at least some of the emails, the indexing request is structured with a first portion that defines a folder, a second portion that defines a message, and a third portion that defines an attachment.

16. The method of claim 15, wherein the first portion defines an identifier that is used to identify the corresponding mailbox in the EDB.

17. A method for creating a full-text index for each of a plurality of mailboxes stored in an Exchange database (EDB), the method comprising:
for each of a plurality of mailboxes stored in an EDB, accessing the EDB to retrieve each email in the mailbox, at least some of the emails including content that is not formatted as plain text;
for each accessed email that was retrieved from one of the plurality of mailboxes stored in the EDB:
converting content of the email that is not formatted as plain text into plain text such that the content that is not formatted as plain text of the email that was retrieved from one of the plurality of mailboxes stored in the EDB is converted into plain text;
creating an indexing request that identifies a full-text index corresponding to the mailbox from which the email was accessed such that a full-text index is created for each of the plurality of mailboxes stored in the EDB, the indexing request also including the content of the email, that was retrieved from the corresponding mailbox stored in the EDB, in plain text format; and
submitting the indexing request to cause the content of the email to be stored in the corresponding full-text index such that the content that is not formatted as plain text in the email retrieved from one of the plurality of mailboxes stored in the EDB is stored in plain text format in the full-text index that corresponds to the mailbox from which the email was accessed.

18. The method of claim 17, wherein, for any email that includes an attachment, the indexing request is structured to cause the content of the attachment to be stored separately from but hierarchically associated with the content of the email.

19. The method of claim 17, wherein, for at least some of the emails, the indexing request is structured with a first portion that defines a folder, a second portion that defines a message, and a third portion that defines an attachment.

20. The method of claim 19, wherein the first portion defines a first identifier that is used to identify the corresponding mailbox in the EDB and a second identifier that identifies the corresponding full-text index, and wherein the second portion defines the second identifier to link the second portion to the first portion.

* * * * *